United States Patent [19]

Bastiaansen

[11] Patent Number: 5,455,308

[45] Date of Patent: Oct. 3, 1995

[54] ENDLESS OBJECTS FROM EPOXY RESIN OR UNSATURATED POLYESTER AND THERMOPLASTIC POLYMER

[75] Inventor: Cornelis W. M. Bastiaansen, Maastricht, Netherlands

[73] Assignee: DSM N.V., Netherlands

[21] Appl. No.: 291,357

[22] Filed: Aug. 16, 1994

Related U.S. Application Data

[63] Continuation of Ser. No. 923,051, Jul. 31, 1992, abandoned.

[30] Foreign Application Priority Data

Aug. 1, 1991 [EP] European Pat. Off. ............ 91201988
Aug. 1, 1991 [EP] European Pat. Off. ............ 91201989

[51] Int. Cl.$^6$ ........................... C08L 63/02; C08L 67/06
[52] U.S. Cl. ........................... 525/407; 525/43; 525/56; 525/58; 525/107; 525/117; 525/169; 525/170; 525/59; 525/207; 525/227; 525/404; 525/408; 525/423; 525/425; 525/426
[58] Field of Search ............... 525/56, 58, 117, 525/119, 169, 170, 423, 425, 447, 523, 43, 107, 407, 408, 59, 207, 227, 404, 426

[56] References Cited

U.S. PATENT DOCUMENTS

| | | | |
|---|---|---|---|
| 2,713,567 | 7/1955 | Scheibi | 260/45.5 |
| 3,772,241 | 11/1973 | Kroekel | 260/40 R |
| 4,021,410 | 5/1977 | Koyama et al. | 525/503 |
| 4,046,843 | 9/1977 | Sano et al. | 522/109 |
| 4,088,620 | 5/1978 | Nihongi et al. | 528/254 |
| 4,128,601 | 12/1978 | McCluskey | 260/862 |
| 4,287,313 | 9/1981 | Uber et al. | 525/91 |
| 4,322,334 | 3/1982 | Arakawa et al. | 525/512 |
| 4,670,485 | 6/1987 | Hesse et al. | 523/436 |
| 4,859,742 | 8/1989 | Pattein et al. | 525/131 |
| 5,070,121 | 12/1991 | Hinterwaldner et al. | 524/31 |
| 5,122,553 | 6/1992 | Takayama et al. | 523/514 |
| 5,317,067 | 5/1994 | Yagi et al. | 525/121 |

FOREIGN PATENT DOCUMENTS

| | | |
|---|---|---|
| 136572 | 4/1985 | European Pat. Off. |
| 234902 | 9/1987 | European Pat. Off. |
| 347516 | 12/1989 | European Pat. Off. |
| 0441047A2 | 8/1991 | European Pat. Off. |
| 58-50721 | 3/1983 | Japan. |
| 61-262707 | 11/1986 | Japan. |
| 1057434 | 2/1967 | United Kingdom. |
| 1276198 | 6/1972 | United Kingdom. |
| 2037298 | 7/1980 | United Kingdom. |
| WO91/1148 | 8/1991 | WIPO. |

OTHER PUBLICATIONS

*CRC Handbook of Chemistry and Physics*, CRC Press, Inc., Boca Raton, Florida, 70th Edition, Weast et al., 1989, p. C–457.
Derwent abstract No. 70–29514R/17 for Japanese 46–41709, Rohm and Haas Co.
Chemical abstracts, vol. 70, No. 2, abstract No. 5195x, Toshiharu et al., 1968.
Chemical abstracts, vol. 70, No. 4, abstact No. 12593d, Bartl et al., 1968.
Derwent abstract No. 84–008508/02, Unitika, 1983.
Derwent abstract No. 85–132683/22, Dainippon Ink Chem., 1985.

*Primary Examiner*—Robert E. Sellers
*Attorney, Agent, or Firm*—Dressler, Goldsmith, Shore & Milnamow, Ltd.

[57] ABSTRACT

Thermosettable composition suitable for the production of endless objects without the use of continuous carrier material, whereby the composition comprises an epoxy resin or an unsaturated polyester and a high molecular weight thermoplastic polymer which has a weight-average molecular weight of at least 1,000,000 g/mol in an amount to make the composition spinnable, the amount ranging from at least 0.1% where the polymer has a molecular weight of 5,000,000 g/mol or more or less than 2% where the polymer has the weight-average molecular weight of 1,000,000 g/mol, the amount decreasing as the weight-average molecular weight increases.

4 Claims, No Drawings

ENDLESS OBJECTS FROM EPOXY RESIN OR UNSATURATED POLYESTER AND THERMOPLASTIC POLYMER

This application is a continuation of application Ser. No. 07/923,051, filed on Jul. 31,1992, now abandoned.

FIELD OF THE INVENTION

The invention relates to a thermosettable composition suitable for the production of endless objects without the use of a carrier material.

BACKGROUND OF THE INVENTION

A composition from which endless objects can be made without using a continuous carrier material is described in JP-A-61262707 which describes a composition based on acrylates which by a special treatment can be processed into endless objects, in particular to optical fibers. To accomplish this, a set-up is built in which an acrylate mixture is pumped through a tube, the acrylates being partially cured in the tube, after which the partially cured acrylates are spun and further cured.

A drawback of a composition as described in JP-A-61262707 is that a complicated treatment is required in order to be able to process the monomers continuously, because the monomers have to be cured partially but must not reach their gel point. Consequently, the range within which the monomers can be continuously processed is rather narrow. This requires accurate adjustment of the process conditions and continuous controlling of the degree of curing during the transport through the tube. Consequently it is a very slow, laborious and thereby costly process, and in any case very sensitive to irregularities.

An object of the present invention is to provide a composition which does not have said drawbacks and from which therefore endless objects can be easily produced.

SUMMARY OF THE INVENTION

The present invention relates to a composition that comprises an epoxy resin or an unsaturated polyester and a high molecular weight thermoplastic polymer.

Because of the HMW thermoplastic polymer, the composition can, for example, be processed and formed in an extruder. Moreover, the composition can be stretched, either in one or in two directions. In this way fibers, sheets, and the like can be produced.

A further advantage of the compositions of the present invention as compared to those described in JP-A-61262707 is that the compositions of the present invention need not be cured until after the spinning or the processing in the extruder, while the compositions of JP-A-61262707 are already partially cured before the spinning.

DETAILED DESCRIPTION OF THE INVENTION

The term "endless objects" as used in the present specification, refers to objects that have a virtually continuous or indefinite length in at least one direction, such as fibers, films, sheets and tubes. The term "carrier material", as used herein, refers to material which potentially is infinitely long, such as filaments or films, and onto which the thermosettable composition is applied and then cured. This includes foils or fibers.

The term "high molecular weight" (HMW) is used herein to mean higher than 50,000 g/mol. Preferably the molecular weight of the thermoplastic polymer is even much higher than 50,000, e.g. 250,000 and higher. If the thermoplastic polymer has a molecular weight of more than 250,000 g/mol, it is considered to have an "ultrahigh molecular weight" (UHMW). The molecular weight is the weight-average molecular weight.

The spinnability will be used as criterion of the continuous processability in the manner as set out herein. If a composition is spinnable, it can normally also be processed to other forms of endless objects besides fibers. The concept of spinnability is difficult to quantify, but in the present specification the definition as given by Ziabicki in Chapter 2 of *Fundamentals of Fibre Formation*, J. Wiley & Sons Ltd., London, 1976, will be used:

"A liquid is spinnable under the given conditions if a steady-state, continuous elongation of the fluid jet proceeds without a break of any kind".

The phrase "the given conditions" is intended to mean conditions as optimized by one skilled in the art.

In the Examples the spinnability is tested by determining whether a thread picked up with a glass rod from a quantity of test material can be elongated and wound around a small glass rod.

The spinnability depends, among other factors, on the molecular weight of the thermoplastic polymer. The higher the molecular weight, the less material has to be added to cause the viscosity to be enhanced by a certain degree in order to make the composition spinnable.

By routine experimentation it is possible to modify the reaction conditions (e.g. the temperature) of most systems in such a way that a composition is spinnable.

Preferably at least part of the thermoplastic polymer is dissolved in the epoxy or unsaturated polyester resin and more preferably all of the polymer is dissolved.

In general, it will be advantageous to add the thermoplastic polymer as little particles with a diameter of less than 0.5 mm, because this improves the speed of dissolution of the thermoplastic polymer in the epoxy or the unsaturated polyester resin. It is also possible to heat the thermoplastic polymer before it is added to the composition.

A fast dissolution speed is not necessary for a successful application of a composition according to the invention.

The molecular weight of the thermoplastic polymer is at least 50,000. The composition preferably contains, relative to the composition as a whole, an amount of the thermoplastic polymer to make the composition spinnable, the amount ranging from at least 0.1% in case the polymer has a molecular weight of 5,000,000 g/mol or more to at most 50% in case the polymer has a molecular weight of 50,000 g/mol, the amount decreasing as the molecular weight increases, the thermoplastic polymer being chosen from the group consisting of polyethylene oxide, polyamide, styrene-maleic anhydride acrylonitrile copolymers, polypropyleneoxide, polyvinyl alcohol, polymethylmethacrylate and polyvinyl acetate.

The minimum quantity of thermoplastic polymer to be added in order to obtain a continuously processable composition also depends on the type of thermoplastic polymer. In general, of thermoplastic polymers that are highly viscous above their melting point, a lower quantity will be needed then of thermoplastic polymers that have low viscosity above their melting point. For instance, in general a higher quantity of a branched thermoplastic polymer than of a linear thermoplastic polymer will be required. In general the desired properties of the composition will be determined by the average chain length of the thermoplastic polymer dissolved in it. This means for instance that of polyethylene oxide (P) a lower weight percentage with a certain molecular weight will suffice than of polyvinyl acetate (PVA), because PEO is less heavy than PVA per unit of chain length.

It is possible to add higher percentages of thermoplastic polymer. However, the properties of the product may be adversely affected by too much thermoplastic polymer. Therefore it is usually desirable to keep the quantity of thermoplastic polymer as small as possible.

The amount of polymer needed to obtain a spinnable composition also depends on the molecular weight of the polymer, the amount required being lower accordingly as the molecular weight is higher. Preferably the molecular weight of the polymer is at least 1,000,000 and the amount present in the composition ranges from at least 0.1% in case the polymer has a molecular weight of 5,000,000 g/mol or more to less than 2% in case the polymer has a molecular weight of 1,000,000 g/mol.

Adding a thermoplastic polymer in a liquid for polymerization in order to increase the viscosity is described in GB-A-1,057,434, which, however, does not refer to epoxy resins or unsaturated polyesters. The objective of that patent specification is to provide a solution to the problem of a polymer not dissolving in its own monomers. There is no suggestion in the patent specification that it would be advantageous to add thermoplastic polymers to a thermosetting system based on unsaturated polyesters or epoxy resins.

GB-A-1,057,434 does describe the possibility of adding to a Newtonian liquid of mainly acrylonitrile a minor quantity of monomer which can bring about a certain degree of crosslinking, but only a low crosslink density is achieved. A product with such a low crosslink density is generally not regarded as a thermoset product. A product obtained by the process according to GB-A-1,057,434 consequently will not possess the excellent properties of a product according to the invention.

A manner of making endless objects from epoxy resins or unsaturated polyesters comprises coating a carrier material such as continuous or semi-continuous fibers with the unsaturated polyester or epoxy resin. Stretching of objects made of carrier fiber is practically impossible. The material is then processed by coextrusion or pultrusion.

The thermoplastic polymer can be chosen from all thermoplastic polymers that can be produced with a high molecular weight and which are compatible with (i.e. at least partially soluble in the unsaturated polyester or epoxy resin to be used. Preferred thermoplastic polymers are polyethylene oxide, polypropylene oxide, styrene-maleic anhydride acrylonitrile copolymers, polyacrylate, poly(m)ethyl-(meth)acrylate, polyarylamide, polyacrylamide or polyvinyl acetate. Preference is given to polymers that can be obtained with extremely high molecular weights, such as polyethylene oxide or polyvinyl acetate.

Epoxy resins are described e.g. in the report by the Process Economics Program of Stanford Research Institute, Menlo Park, Calif., "*Epoxy Resins*", February 1984, hereby incorporated by reference (hereinafter referred to as the "SRI-report").

Epoxy resins are further described in the Encyclopedia of Polymer Science and Engineering, Volume 6, John Wiley & Sons, New York, second edition, 1986, pp. 322–382, hereby incorporated by reference.

Epoxy resins are further described in Kunststoff Handbuch, Volume 10, Duroplaste, by W. Woebcken, Carl Hauser Verlag, Munchen, 1988, pp. 103–120, hereby incorporated by reference.

The unsaturated polyester can be any unsaturated polyester and is preferably chosen from the ethylenically unsaturated cross-linkable polyesters or polymers with terminal acrylate derivative groups, the so-called vinylester polymers. Of course, mixtures of these polymers can also be used. These polymers are preferably used in combination with an ethylenically unsaturated monomer and/or prepolymer. More preferably the unsaturated polyesters are polyesters with alkene unsaturation in the polymer chain.

These polymers preferably have medium or high reactivity so that a high rate of reaction can be realized. The molecular weight per double bond is preferably lower than 800, more preferably lower than 400.

Such a polymer preferably has a weight-average molecular weight of 412–8000, more preferably 500–6000, and most preferably 700–4000.

Such a polymer usually has an acid number of 0–100, preferably 0–50, and more preferably 1–25.

Such a polymer usually has a hydroxyl number of between 0 and 200, preferably between 1 and 100, and more preferably between 1 and 50. The hydroxyl and acid numbers are defined as mg KOH per gramm polymer according to respectively ASTM E 222-73 and ASTM D 1639-70.

The unsaturated polymers are mainly synthesized from organic compounds containing carboxyl groups and alcohol groups. Usually diacids and dialcohols are used, however up to 40% (wt) of the two types of difunctional monomers can be replaced by higher-functional monomers and monofunctional monomers and mixtures thereof. Preferably less than 20% (wt) of the two types of difunctional monomers is replaced by a higher-functional monomer.

Preferably at least one ethylenically unsaturated acid is used. It may be an advantage to terminate the polyester with an unsaturated monocaoxylic acid.

A special class of polyesters is formed by the vinylester polymers. Vinylester polymers are built up from polyols and possibly polyacids, with terminal acrylate groups, methacrylate groups or other acrylates substituted at the β-site with a $C_2$–$C_4$ alkyl group. Vinylesters usually are the reaction products of polyepoxides and (meth)acrylic acids. The vinylester thus has terminal (meth)acrylate groups. The polyols may be OH-terminated polyesters, novolak, phenol, ethers or polyesters or, for example, half esters or polyols modified with epoxy, isocyanate or polyamide groups.

The acids that can be applied normally contain fewer than 30 carbon atoms, preferably fewer than 20, and more preferably fewer than 10 carbon atoms.

The ethylenically unsaturated diacid is preferably an α,β-ethylenically unsaturated diacid, for example a diacid chosen from the group of fumaric acid, maleic acid, chloromaleic acid, itaconic acid, mesaconic acid, citraconic acid and the corresponding esters and anhydrides.

An ethylenically unsaturated mono or triacid can be chosen, for example, from the group of linoleic acid, and the other unsaturated fatty acids, cinnamic acid, atropic acid, acrylic acid, methacrylic acid, ethacrylic acid, propacrylic acid, crotonic acid, isocrotonic acid and corresponding ester and anhydride derivatives.

Other diacids are preferably saturated-(cyclo)aliphatic or saturated-aromatic compounds. Aliphatic and aromatic diacids are chosen, for example, from the group of succinic acid, glutaric acid, methylglutaric acid, adipic acid, sebacic acid, pimelic acid, phthalic acid, isophthalic acid, terephthalic acid, dihydrophthalic acid, tetrahydrophthalic acid, hexahydrophthalic acid, tetrachlorophthalic acid, 3,6-endomethylene-1,2,3,6-tetrahydrophthalic acid, 1,4-cyclohexane dicarboxylic acid and hexachloroendomethylenetetrahydrophthalic acid and the corresponding ester and anhydride derivatives.

Aromatic carboxylic acids are preferably present in amounts of 5–50 weight % to obtain optimum mechanical properties.

Mono and/or higher-functional aromatic or aliphatic carboxylic acids are chosen, for example, from the group of benzoic acid ethylhexanoic acid, mono or trimeric fatty acids, such as stearic acid, acetic acid, propionic acid, pivalic acid, valeric acid, trimellitic acid, 1,2,3,4-butanetetracarboxylic acid, 1,2,5-benzenetetracarboxylic acid, 1,4,5,6-naphthalenetetracarboxylic acid, 1,2,3-propanetricarboxylic acid, 1,2,3-tricarboxylic acid butane, camphoric acid, naphthoic acid, toluic acid and the corresponding ester and anhydride derivatives.

The alcohols that can be used normally contain fewer than 30 carbon atoms, particularly fewer than 20 carbon atoms. It is preferred to use saturated aliphatic alcohols or alcohols containing an aromatic group, ethylenically unsaturated alcohols can be used also. Dialcohols are chosen, for example, from the group of ethylene glycol, di(ethylene glycol), tri(ethylene glycol), 1,2-propanediol, 1,3-propanediol, 1,2-butanediol, 1,3-butanediol, 1,4-butanediol, 2-methyl-1,3-propanediol, 1,4-pentanediol, 1,4-hexanediol, 1,6-hexanediol, 2,2-dimethyl-propanediol, cyclohexanediol, 2,2-bis(hydroxycyclohexyl)-propane, 1,2-trithylol-propanemonoallylether, pinacol, 2,2,4-trimethylpentanediol-1, 3,3-methylpentanediol-1,5, with 1–3 equivalents of ethoxylated or propoxylated bisphenol-A and novolak prepolymers possibly partly etherified and ethoxylated. Instead of 1,2-diol, the corresponding oxirane compound can be used.

Mono and higher-functional alcohols are chosen, for example, from the group of methanol, ethanol, 1- or 2-propanol, 1- or 2-butanol, one of the isomers of pentanol, hexanol, octanol, 2-ethylhexanol, fatty alcohols, benzyl alcohol, 1,2-di(allyloxy)-3-propanol, glycerol, 1,2,3-propanetriol; pentaerythritol, tris(hydroxyethyl)-isocyanurate and novolak prepolymers, possibly partly etherified and ethoxylated. Instead of 1,2-diol, the corresponding oxirane compound can be used.

It is also possible to use di and/or higher-functional alcohols having more than 30 carbon atoms. These preferably have a molecular weight lower than 5000, more preferably lower than 2000, but higher than 400. Di and/or higher-functional alcohols having a molecular weight higher than 400 are chosen, for example, from the group of polyethylene glycols, polypropylene glycols, addition products of ethylene oxide and/or propylene oxide with bisphenol-A, and phenol-formaldehyde (pre)polymers, preferably epoxidated.

It is preferred to use an unsaturated polyester modified with dicyclopentadienyl (DCPD) units. This will result in an increase of the glass-transition temperature (Tg) of the resulting article. It is particularly preferred to use an unsaturated polyester with 2–45% (wt), more specifically with 20–35% (wt) DCPD. For a further increase of the Tg, the polymer can be modified also with imide groups and/or amide groups. To this end diamines and alcohol amines can be used.

The monomer reactive with the unsaturated polyester preferably is an ethylenically unsaturated monomer. The monomer is used in an amount of 10 to 50 (wt) % as related to the unsaturated polyester.

Normally the ethylenically unsaturated monomer contains fewer than 50 carbon atoms, preferably fewer than 30, and more preferably fewer than 15, but more than 3 carbon atoms. The monomer is preferably of the vinyl-aromatic, vinylether, vinylester, acrylate and/or allyl type. More specifically an acrylate compound or vinyl-aromatic compound is used, because these react quickly during the polymerization reaction.

Vinylaromatic compounds are chosen, for example, from the group of styrene, α-methylstyrene, p-methylstyrene, o-, m-, p-chlorostyrene, t-butylstyrene, divinylbenzene, bromostyrene, vinylnaphthalene, α-chlorostyrene, vinyl-toluene and divinylnaphthalene.

Acrylate compounds are chosen, for example, from the group of methyl, ethyl, propyl, isopropyl, butyl, isobutyl, phenyl or benzyl acrylate and methacrylate, 2-ethylhexyl (meth)acrylate, dihydrodicyclopentadiene acrylate, cyclohexyl (meth)acrylate, butanediol (meth)acrylate, (meth)acrylic acid amide, butanediol di-(meth)acrylate, the reaction products of (meth)acrylic acid and phenyl- or cresylglycidyl ethers, propyleneglycol di(meth)acrylate, di- and triethyleneglycol di(meth)acrylate, di- and tripropyleneglycol di(meth)acrylate, hexanediol di(meth)acrylate, trimethylolpropane tri(meth)acrylate, hexanediol di(meth)acrylate, and trimethylolpropane tri(meth)acrylate. Derivatives of acrylates substituted at the β-site with $C_2$–$C_4$ can also be used.

Vinylether compounds, vinylester compounds and allyl compounds are chosen, for example, from the group of allylphthalate, triallylcyanurate, diallylisophthalate, diallylterephthalate, diallylphthalate, ethylhexanoic acid vinylester, vinylacetate, vinylpropionate, vinylpivalate, vinylether, vinylpropylolether, vinylbutylolether and vinylbenzylalcoholethers.

The thermoplastic polymer should at least partially dissolve in the epoxy resin or the unsaturated polyester. Depending on the choice of thermoplastic polymer and epoxy resin or unsaturated polyester and the rate of curing, a molecular blend is obtained or a crystallization or a phase separation takes place upon curing. The latter may give rise to favorable properties, such as improved toughness of the final product.

Low molecular thermoplastic polymers may further be added to the composition to improve certain properties, such as the impact resistance.

Other additives may be used in the composition, such as inhibitors, promoters, accelerators, flexibilizers, lubricants, release agents, antioxidants, pigments, surfactants, crosslinkers, fillers or fiber reinforcement agents.

Initiation of the curing may be effected in all ways by which epoxy resins or unsaturated polyesters can be cured, such as thermally and with UV light. Possible initiators and catalysts are described in said SRI-report, hereby incorporated by reference.

Preferably, the curing takes place under the influence of UV light. The point in time at which curing commences can be freely chosen: during or after the shaping process or during the cooling stage. An additional advantage is that when UV curing is applied higher temperatures can be used during the suspending, dissolving and extruding or spinning, without causing the curing to start already.

A possible mode of operation for a process for the manufacture of products is the following:

The thermoplastic polymer is suspended and dissolved in the epoxy resin or unsaturated polyester. This may require heating of the composition to a suitable temperature, for instance between 50° and 200° C. Preferably the composition is not heated to a temperature at which one or more of the components start to boil. The mixture is then extruded or spun and then partially or fully cured.

A possible way of combining thermoplastic polymer and the epoxy resin or unsaturated polyester is to mix an amount of thermoplastic polymer particles into the low viscosity epoxy resin or unsaturated polyester at a low temperature, thereby forming a low viscosity suspension. The low viscous suspension can easily be pumped into e.g. an extruder. In the extruder the suspension is heated up and the thermoplastic polymer dissolves, thereby increasing the viscosity. From this extruder filaments are extruded and cured afterwards.

Additional steps in this mode of operation can be mixing in of reinforcements such as strengthening fibers in the composition and stretching of the extruded or spun intermediate.

The phrase "strengthening fibers", as used herein, is intended to include fibers that have properties that are such that they improve the properties of the product in which those fibers are incorporated. Strengthening fibers will normally not melt or otherwise loose their mechanical strength under the processing conditions. Examples are glass fibers and carbon fibers, but any other fiber can be used.

The viscoelasticity of the composition can be adjusted to the chosen method of processing. If spinning in a downward direction is selected, a lower weight percentage or a lower molecular weight thermoplastic polymer will suffice than in the case of, for example, film blowing in an upward direction.

If it is intended to produce thin objects, it is preferred to stretch the composition, before the curing. If fibrous fillers have been added, which are required to be in an oriented condition in the product, it is also preferred to stretch the composition prior to curing. If anisotropy is desired in the final product, it is preferred to stretch after or during the curing. After curing the product comprises a densely crosslinked three dimensional network, but can be stretched a little bit.

Preferably, the composition is stretched uniaxially to a fiber with a thickness of less than 1 mm or biaxially to a sheet with a thickness of less than 1 mm.

If the curing of the epoxy resins or unsaturated polyesters is effected with supply of heat, it can be advantageous to perform the curing in a bath filled with a liquid that is inert during the curing reaction and has a specific gravity which is virtually equal to that of the composition.

It is possible to have the reaction take place under the influence of a catalyst, which is in the inert liquid and from there diffuses into the composition.

It is possible to postcure the products. This could render products with even better properties and especially with better high temperature properties.

Products made from a composition according to the invention are, depending on the starting materials, suitable for applications in these areas where good temperature resistance, good flame resistance and/or good corrosion and solvent resistance are required besides good mechanical properties. Examples are cable sheathing, fireproof clothing, asbestos replacement, high temperature filters, high temperature films for flexible printed circuits, aircraft interiors, precursors for carbon fiber, food packagings (for instance for use in a microwave oven), condenser films, optical fiber and filament winding products. Here it is a significant advantage that the epoxy resin composition according to the invention need not be processed at a high temperature, in contrast to thermoplasts with a high intrinsic temperature resistance. The invention is notably advantageous where sheets, films, fibers, tubes or other endless objects are required with one or more of the above-mentioned properties. The products, further, can be produced as bundles of thin filaments or as single, thicker monofilaments. The products according to the invention can be reduced to products of smaller length by cutting, sawing, breaking or similar methods.

The invention will be illustrated by means of the following examples and comparative experiments, without being restricted thereto.

In these examples, tensile tests on fibers were performed at room temperature on a Zwick tensile tester with fiber clamps. The initial length of the fiber was 50 cm; the crosshead speed was 5 cm/min. From the measured stress/strain curve the (Young's) E-modulus, the tensile strength and the elongation at break were determined.

As molecular weight the value according to the manufacturer was used.

LOI measurements were performed according to ASTM D2863.

DMA measurements were performed according to M. E. Brown, Introduction to Thermal Analysis, chapter 8, pp. 72 ff.

TGA and DSC measurements were performed according to F. W. Billmer, Textbook of Polymer Science, John Wiley and Sons, ISBN 0 441 072966.

Example I

Determination of the percentages of thermoplastic polymer required for spinnability of epoxy resins Polyethylene oxide (PEO) was obtained from Aldrich Chemie, W. Germany, with molecular weights of 200,000, 900,000 and 5,000,000 according to the manufacturer.

Three PEO's of different molecular weight were suspended at room temperature in an epoxy resin (Epikote RXE-11 from ell Resins) with varying concentrations. The different molecular weights and concentrations are listed in Table 1. The PEO was dissolved in the resin in a Brabender kneader at a temperature of 120° C.

The solution was transferred to dishes, which were subsequently heated to two different temperatures: 30° C. and 60° C.

With a glass rod it was attempted to pick up a thread of material from each dish and then to wind the thread around a small glass rod positioned horizontally over the dish. The spindle was in a slow rotating motion The phrase "moderately spinnable", as used in the following tables, means that only after several attempts and with very careful action was it possible to pick up such a thread from the solution, wind it around the spindle and continuously withdraw a thread.

TABLE I

| | Spinnability at 30° C. and 60° C. | | | |
|---|---|---|---|---|
| | [g/mole] | Concentration of [% w/w] | 30° C. | 60° C. |
| a | $2 \times 10^5$ | 1 | − | — |
| b | $2 \times 10^5$ | 5 | ± | − |
| c | $2 \times 10^5$ | 10 | + | − |
| d | $2 \times 10^5$ | 20 | ++ | + |
| e | $9 \times 10^5$ | 0.1 | ± | — |
| f | $9 \times 10^5$ | 1.0 | + | − |
| g | $9 \times 10^5$ | 2.5 | + | − |
| h | $9 \times 10^5$ | 5.0 | ++ | + |
| i | $9 \times 10^5$ | 10.0 | ++ | ++ |
| j | $5 \times 10^6$ | 0.1 | ++ | + |
| k | $5 \times 10^6$ | 0.2 | ++ | + |
| l | $5 \times 10^6$ | 0.5 | ++ | ++ |
| m | $5 \times 10^6$ | 1.0 | ++ | ++ |

The concentration of the thermoplastic polymer is given as weight percentage relative to the total composition. The spinnability was measured according to the test method as described above; — means very poorly spinnable, - means poorly spinnable, ± means moderately spinnable and ++ means very well spinnable.

The Table shows that if thermoplastic polymer with a higher molecular weight is used, a lower percentage is required to make the solution spinnable than of thermoplastic polymer with a lower molecular weight.

Comparing the two temperatures shows that at higher processing temperatures relatively more has to be added to make the solution spinnable.

The data demonstrates that at a desired processing temperature of 30° C. the composition should contain at least 1% w/w of a thermoplastic polymer with a molecular weight of $9\times10^5$ for good results and at a desired processing temperature of 60° C. the composition preferably contains 5% w/w of the thermoplastic polymer with a molecular weight of $9\times10^5$.

However, the quantities stated above apply here to PEO with the given epoxy resin. If other epoxy resin containing compositions and/or other HMW polymers are used, the figures will probably be different. The above guidelines provide clear indication how the invention can be applied in analogous cases.

Comparative Example A

The procedure of Example I was repeated, but without mixing in PEO in the epoxy resin. The solution could not be spun to a fiber at a temperature of 30° or 60° C.

Example II

Determination of the percentages of thermoplastic polymer required for spinnability of unsaturated polyesters Polyethylene oxide (O) was obtained from Aldrich Chemie, W. Germany, with molecular weights of 100,000, 300,000, 600,000 and 5,000,000 according to the manufacturer.

The unsaturated polyester was a Stypol® 40 8210 of DSM Resins, Zwolle, NL.

Four PEO's of different molecular weight were suspended at room temperature in the unsaturated polyester with varying concentrations. The different molecular weights and concentrations are listed in Table II. The PEO was dissolved in the resin in a Brabender kneader at a temperature of 120° C.

The solution was transferred to dishes, which were subsequently heated to two different temperatures (40° C. and 80° C.) and evaluated by the procedure of Example I.

TABLE II

| | Spinnability at 40° C. and 80° C. | | | |
|---|---|---|---|---|
| | [g/mol] | Concentration of [% w/w] | 40° C. | 80° C. |
| a | 100,000 | 1 | — | — |
| b | | 5 | — | — |
| c | | 10 | — | — |
| d | 300,000 | 1 | — | — |
| e | | 5 | ± | ± |
| f | | 10 | + | ± |
| g | 600,000 | 1 | ± | — |
| h | | 5 | + | ± |
| i | | 10 | ++ | + |
| j | 5,000,000 | 0.5 | + | ± |
| k | | 1.0 | + | + |
| l | | 5.0 | ++ | ++ |

The data demonstrates that at a desired processing temperature of 40° C. the composition should contain at least 1% w/w of a thermoplastic polymer with a molecular weight of 600,000 and that at a processing temperature of 80° C. the composition preferably contains 5% w/w of the thermoplastic polymer with a molecular weight of 600,000 for good results.

However, the quantities stated above apply here to PEO with the given unsaturated polyester. If other unsaturated polyester containing compositions and/or other HMW polymers are used, the figures will probably be different. The above guidelines provide a clear indication how the invention can be applied in analogous cases.

Comparative Experiment B

The procedure of Example II was repeated, but without mixing in PEO in the unsaturated polyester. The solution could not be spun to a fiber at a temperature of 40° or 80° C.

Example III

An amount of the resin of Example II was mixed with an amount of PEO with a molecular weight 600,000 in particle form (weight ratio resin to thermoplast 95:1) at room temperature to obtain a low viscous suspension. To the suspension an amount of 3% Irgacure 651 was added as an UV-initiator. The suspension was pumped into a Brabander extruder. In the extruder, the suspension was heated to 80° C., where a solution is formed.

The solution was extruded and fed, through a metering pump, to a die, containing 10 holes. The 10 resulting filaments were wound around a spindle, which turned around with such a speed that the fibers were stretched between the die and the spindle. The stretching and winding took place under a $N_2$-blanket. The fibers were cured by emitting UV-light on them between the die and the spindle.

The multi filament yarn had a Young's modulus of 2 GPa and a Tensile Strength of 35 MPa.

I claim:

1. Thermosettable, spinnable composition comprising an epoxy resin or an unsaturated polyester resin that is suitable for the production of continuous length objects without the use of continuous carrier material wherein the composition also contains a thermoplastic polymer, selected from the group consisting of polyethylene oxide, polyamide, styrene-maleic anhydride-acrylonitrile copolymers, polypropylene oxide, polyvinyl alcohol, polymethacrylate and polyvinyl acetate, at least part of which is dissolved in the resin and which has a weight-average molecular weight of at least 1,000,000 g/mol in an amount to make the composition spinnable, the amount ranging from at least 0.1% where the polymer has a molecular weight of 5,000,000 g/mol or more to less than 2% where the polymer has a weight-average molecular weight of 1,000,000 g/mol, the amount decreasing as the weight-average molecular weight increases.

2. The composition according to claim 1 wherein the composition further comprises fibrous strengthening material.

3. The composition according to claim 2 wherein the unsaturated polyester is chosen from the group consisting of ethylenically unsaturated crosslinkable polyesters, polymers with terminal acrylate derivate groups, and mixtures thereof.

4. Continuous length object obtained by at least partial curing of a composition according to claim 1.

* * * * *